Dec. 17, 1935.  W. BLACKMORE ET AL  2,024,204
JOURNAL BOX
Filed July 30, 1931   7 Sheets-Sheet 1
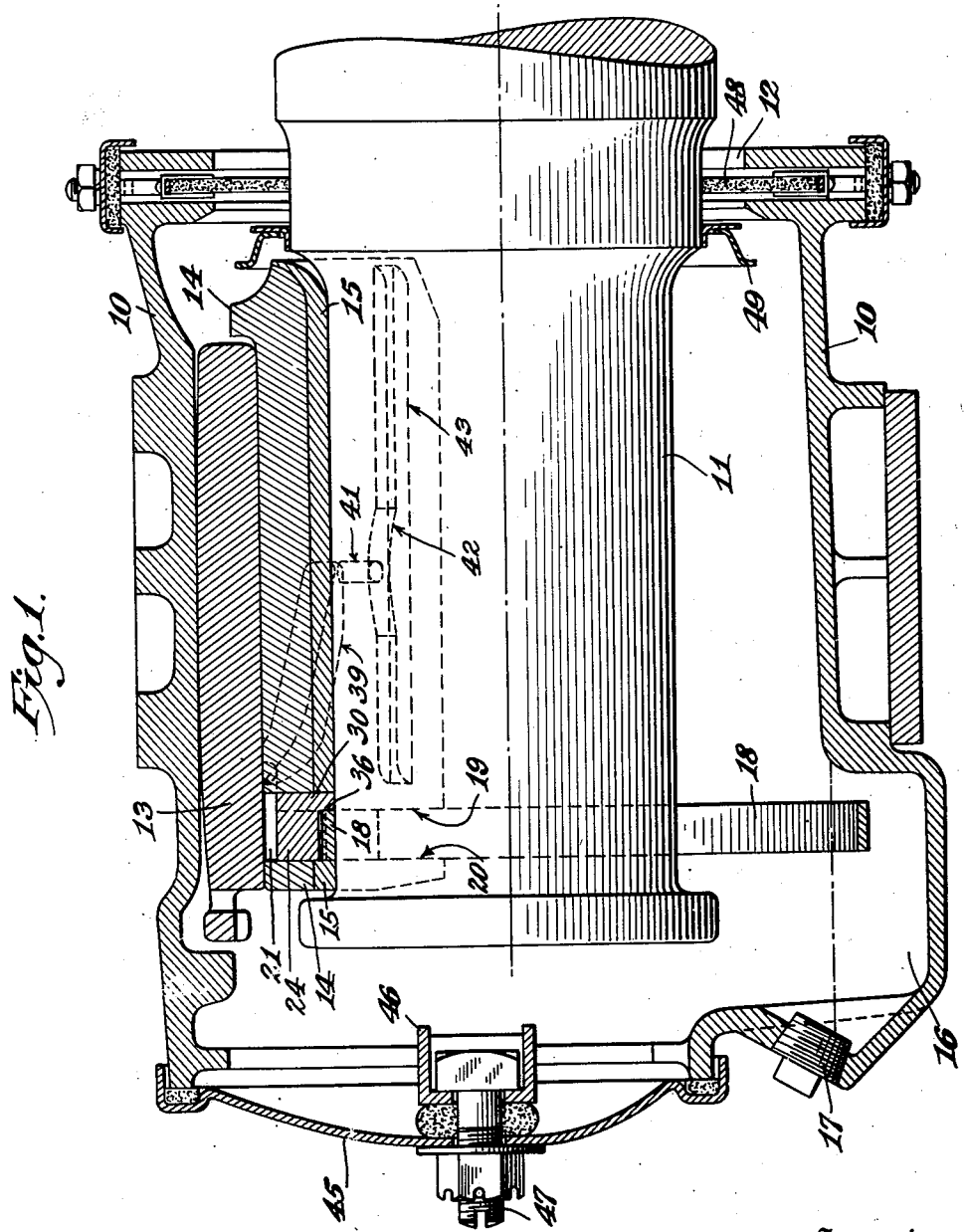

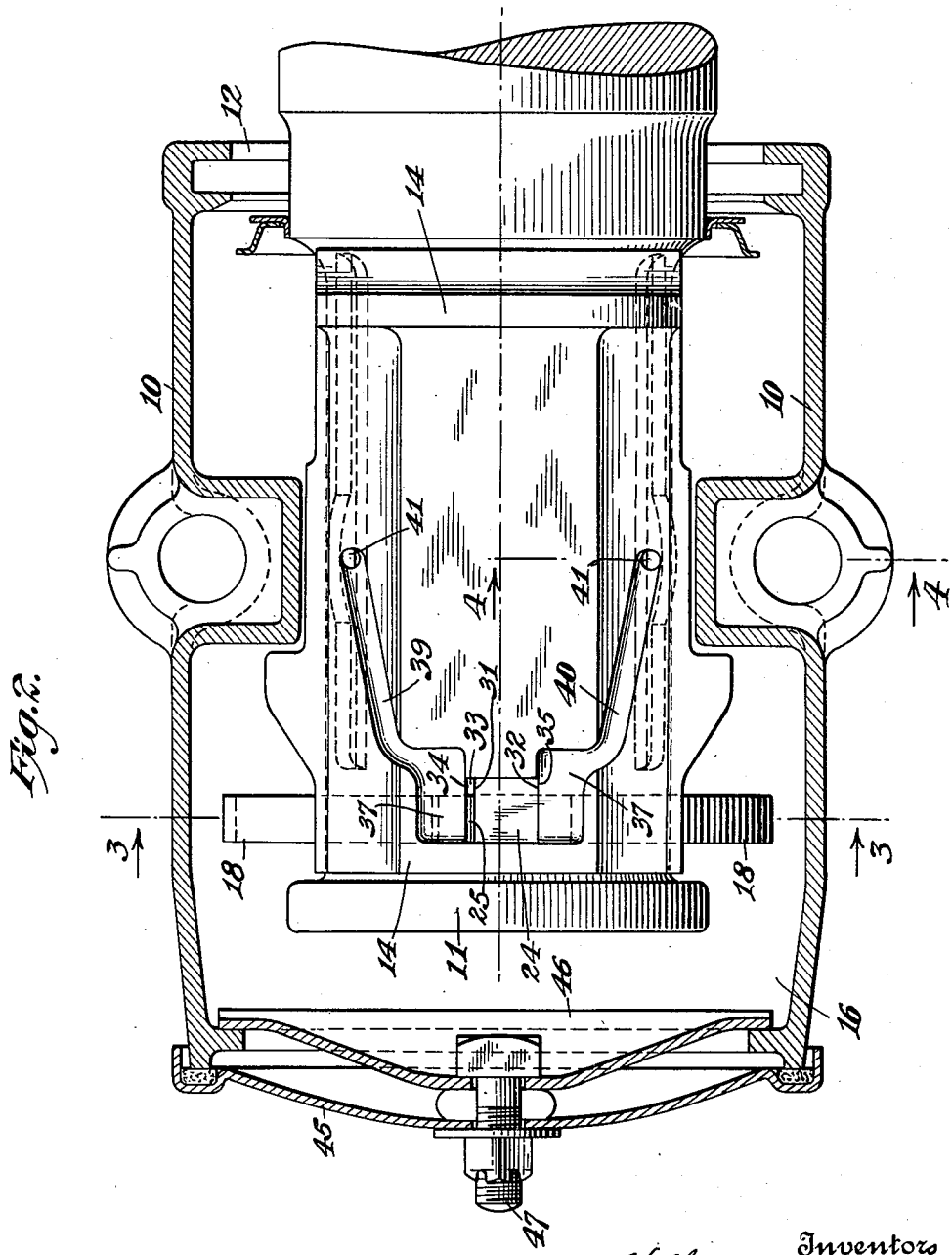

Dec. 17, 1935.  W. BLACKMORE ET AL  2,024,204
JOURNAL BOX
Filed July 30, 1931   7 Sheets-Sheet 3
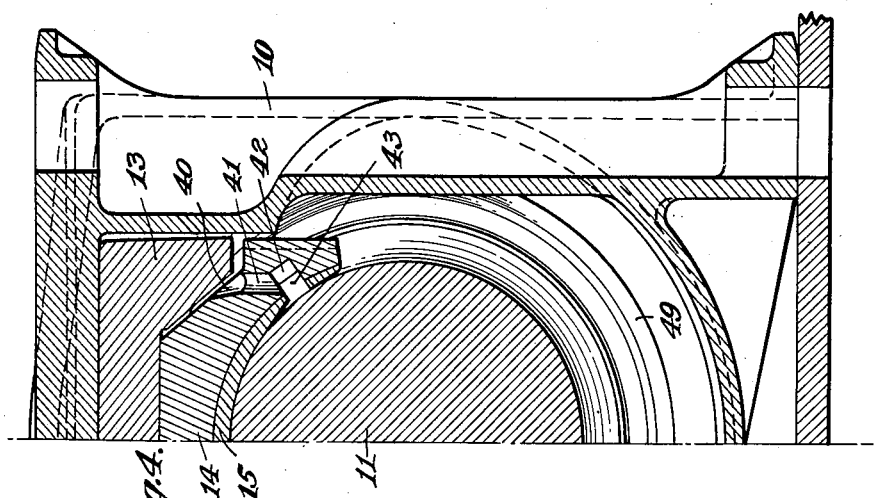
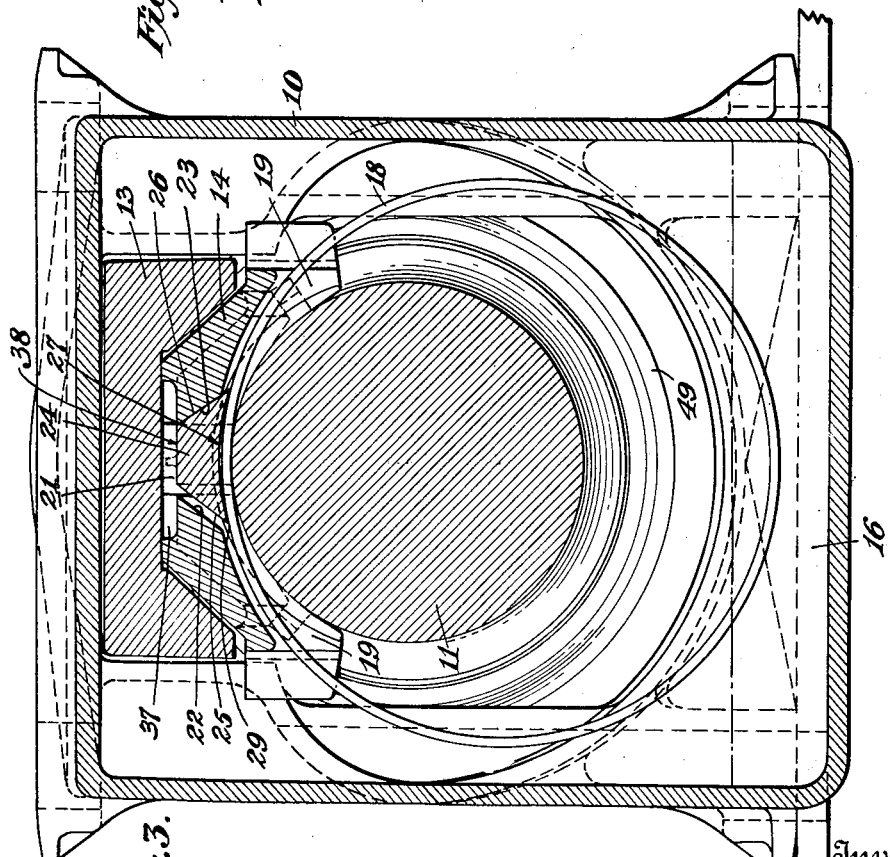
Inventors
William Blackmore
and Albert O. Buckins
By their Attorney
Clarence D. Kerr

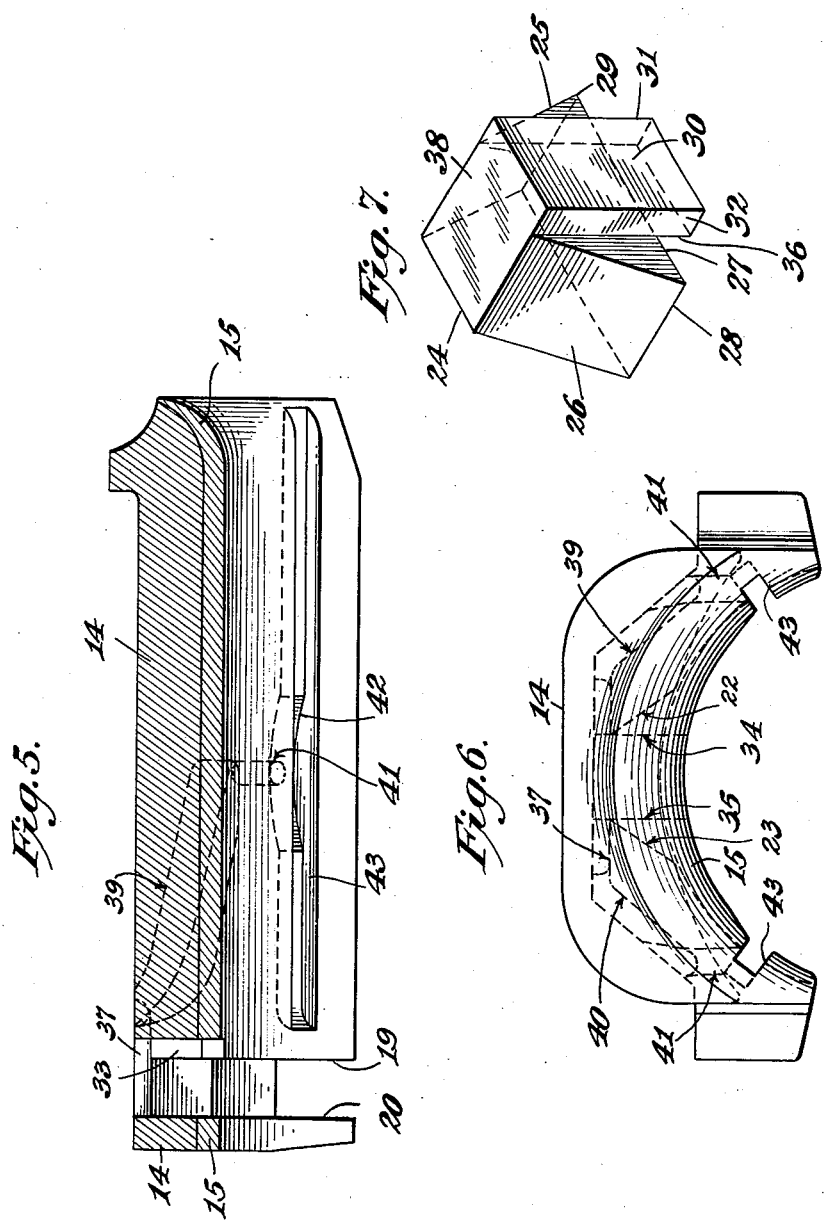

Dec. 17, 1935.  W. BLACKMORE ET AL  2,024,204
JOURNAL BOX
Filed July 30, 1931  7 Sheets-Sheet 5
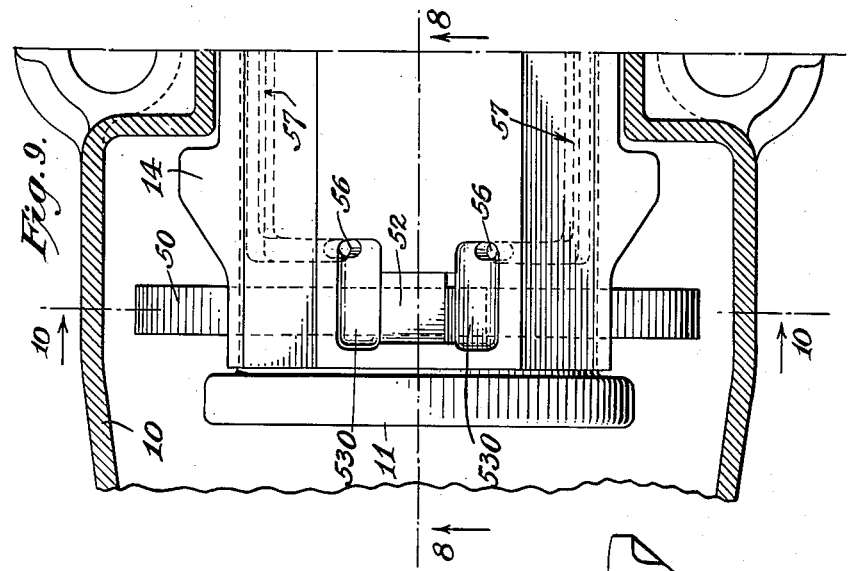
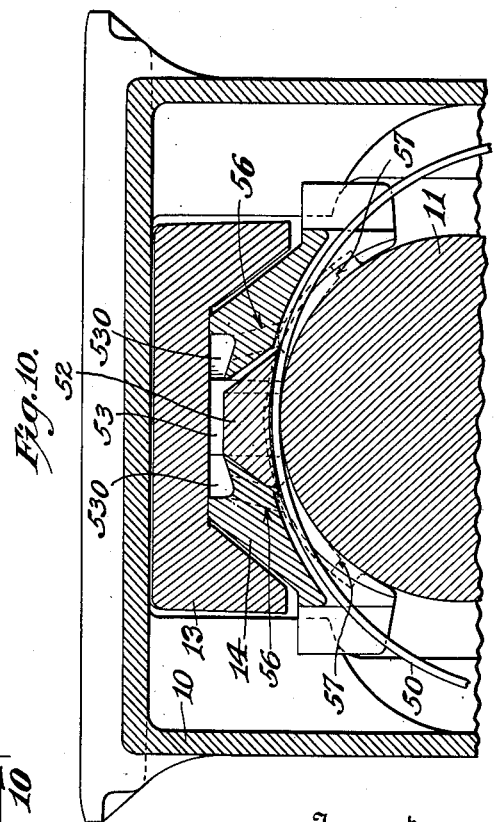
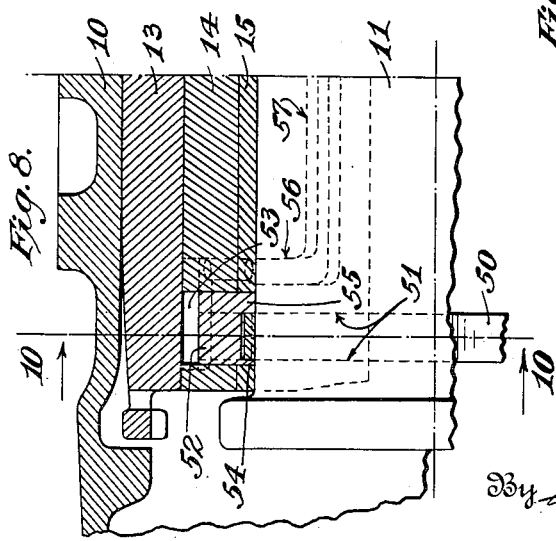
Inventors
William Blackmore
and Albert O. Buckius
By their Attorney
Clarence D. Kerr Dec. 17, 1935.　　W. BLACKMORE ET AL　　2,024,204
JOURNAL BOX
Filed July 30, 1931　　7 Sheets-Sheet 6

Inventors
William Blackmore
and Albert O. Buckius
By their Attorney
Clarence Kerr Dec. 17, 1935.  W. BLACKMORE ET AL  2,024,204
JOURNAL BOX
Filed July 30, 1931  7 Sheets-Sheet 7
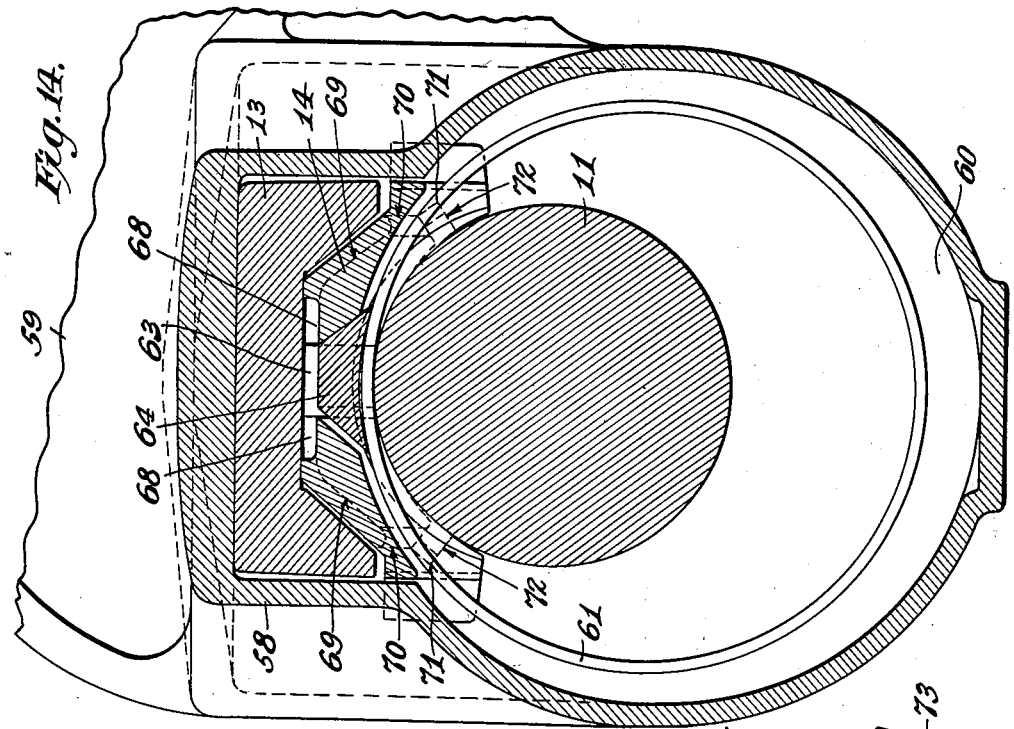
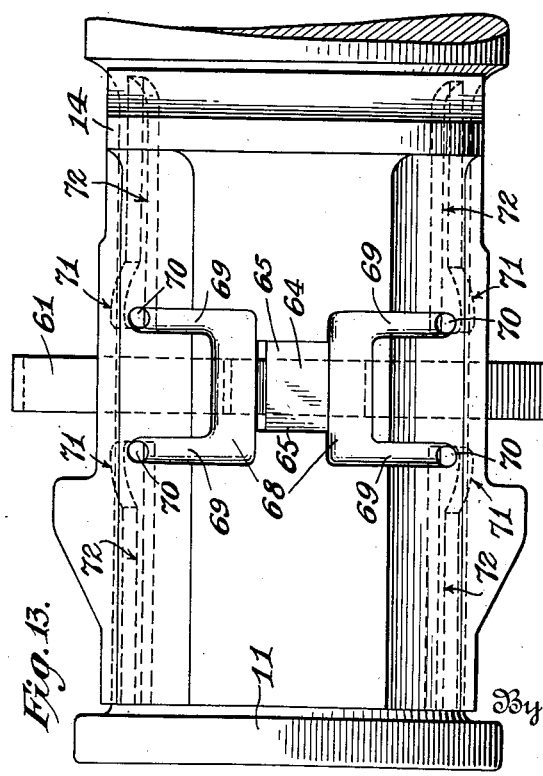
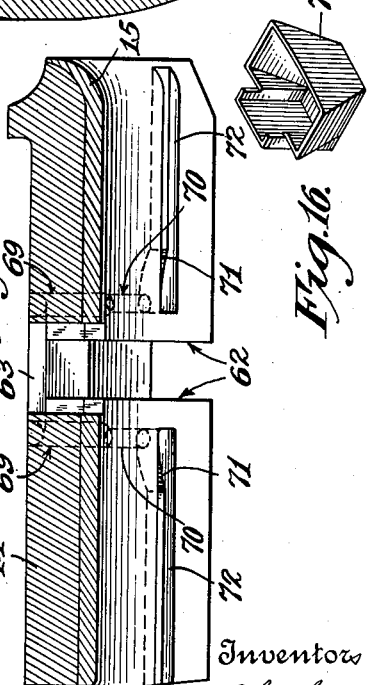

Patented Dec. 17, 1935

2,024,204

UNITED STATES PATENT OFFICE 2,024,204

JOURNAL BOX

William Blackmore, Sharon, Pa., and Albert O. Buckius, Cleveland, Ohio, assignors to National Malleable & Steel Castings Company, Cleveland, Ohio, a corporation of Ohio Application July 30, 1931, Serial No. 553,954

15 Claims. (Cl. 308—85)

This invention relates to improvements in journal boxes and more particularly to an improved method and means of effecting lubrication of the heating surfaces between the journal and a bearing.

An important feature of the present invention is the provision of an oil ring in such relation to the wedge and brass of a plain bearing journal box unit as to positively force a lubricant from the bottom of the box onto the bearing surfaces between the journal and the brass. To assist in the distribution of the oil the brass is preferably provided with various passages or ducts adapted to convey the lubricant from a reservoir in the top of the brass or from a suitable point of delivery of the oil by the ring under pressure, to suitable portions of the bearing surfaces. The desired pumping action upon the oil may be effected solely by a special relation between the ring and the brass or it may be brought about through the provision of certain auxiliary devices. The arrangement in any case is such that the oil will be fed between the bearing surfaces during rotation of the journal in either direction.

Other features and advantages of the invention will appear from the detailed description of various illustrative embodiments which will now be given in conjunction with the accompanying drawings in which:

Fig. 1 is a vertical, central, longitudinal, sectional view through a journal box, as applied to a journal embodying the features of the invention.

Fig. 2 is a horizontal sectional view through the box showing the brass supplied to the journal.

Fig. 3 is a vertical, transverse, sectional view through the box, taken along the line 3—3 of Fig. 2.

Fig. 4 is a partial, vertical, transverse sectional view through the box, taken along the line 4—4 of Fig. 2.

Fig. 5 is a longitudinal, central, sectional view through the brass employed in the construction of Fig. 1.

Fig. 6 is a rear elevational view of the brass.

Fig. 7 is a perspective view of a device employed in the form of the invention disclosed in Fig. 1 to assist in the pumping of the oil.

Fig. 8 is a detail view, in longitudinal vertical section taken along the line 8—8 of Fig. 9 through a portion of a modified form of construction.

Fig. 9 is a detail view in horizontal section taken above the brass of the modified form of construction.

Fig. 10 is a transverse, vertical section taken along the lines 10—10 of Figures 8 and 9.

Fig. 13 is a plan view of the brass and cooperating parts of the construction shown in Figure 11.

Fig. 14 is a transverse, vertical sectional view through the modified construction, taken along the line 14—14 of Fig. 11.

Fig. 15 is a central, longitudinal, vertical section through the brass of Figures 11 to 14, and Fig. 16 is a detail, perspective view of a further modified form of oil feeding device which may be employed.

Figure 11:
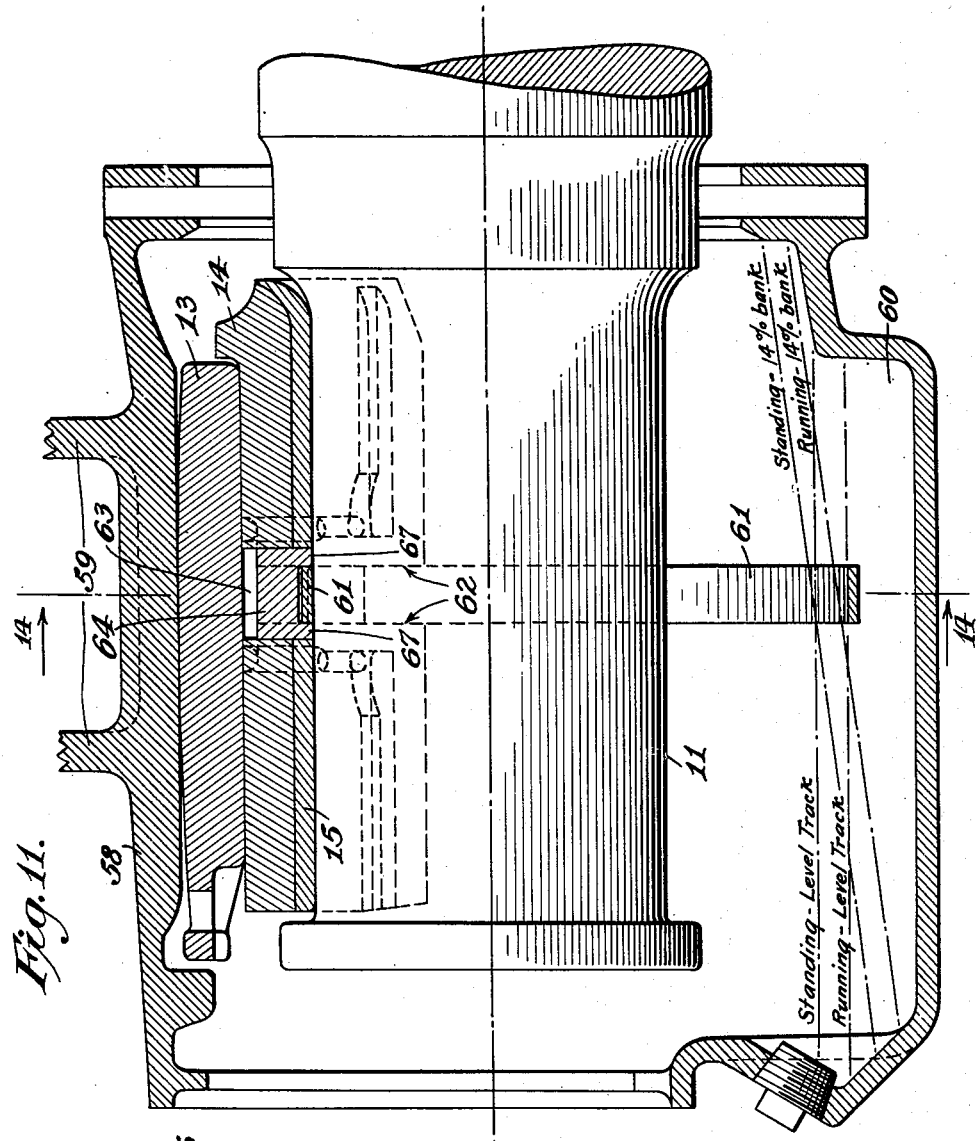
Fig. 11 is a longitudinal vertical section through a journal box embodying a further modified construction.
Figure 12:
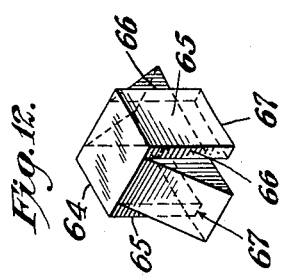
Fig. 12 is a detail, perspective view of a device employed in the construction of Figure 11.

Referring now to the drawings, and particularly to Figs. 1–7, inclusive, there is shown a journal box 10 adapted to be supported in the usual way by the side frame of a railway truck. A journal 11 extends into the box through an opening 12 provided at the rear end of the box. To provide a bearing between the under surface of the top of the box and the top of the journal a wedge 13 and brass 14 of usual construction, except as hereinafter specified, are inserted. The inner surface of the brass carries a Babbitt metal lining 15. At the forward end the box is provided at the bottom with a well or reservoir 16 adapted to retain a suitable supply of lubricating oil. This oil may be introduced through an opening in the front of the box which is normally sealed by means of a plug 17. An oil ring 18 carried by the journal adjacent its forward end depends into the reservoir 16 to some extent below the normal oil level. The brass 14 adjacent its forward end is provided with a groove between a shoulder 19 on the main body of the brass and a shoulder 20 on a depending lip portion of the brass. This groove is adapted to rather snugly receive the oil ring. At the top of the journal the groove is provided with an opening 21 which passes completely through the top of the brass. This opening has oppositely inclined walls 22 and 23 and is adapted to receive an oil scraping and feeding block 24 shown in perspective in Fig. 7. This block is provided with inclined surfaces 25 and 26 opposite the inclined walls 22 and 23 of the opening 21.

The distance between the surfaces 25 and 26 is slightly less than the distance between the walls 22 and 23 so that a clearance is provided between one or the other of the pair of opposed faces. The block 24 is allowed to float rather freely within the opening so that it will be carried by the oil ring, or journal, until it is arrested with one of its surfaces 25 or 26 substantially in contact with the surface 22 or 23. As shown in Fig. 3 the block is shifted toward the right as it would be in response to a clockwise rotation of the journal. The under surface 27 of the block is preferably not made strictly concentric with the outer surface of the ring. It is preferably formed along an arc of shorter radius so as to provide substantially only line contact at the two ends 28 and 29 of the block. This will provide a definite edge to remove the oil from the ring and will also prevent the formation of a partial vacuum between block and ring. It will be apparent that if too great an amount of friction is generated at this point because of adhesion there will be danger of stopping the rotation of the oil ring or at least materially retarding its rotation to an undesirable degree.

In order to prevent tipping of the block 24 as it is shifted by the oil ring, or journal, which might result in binding of the block between the surfaces 22 and 23, it is provided with an extension 30 having vertically disposed walls 31 and 32. The extension 30 is adapted to fit into a rectangular recess 33 formed as an extension of the opening 21 in the brass. The recess 33 is provided with vertically extending side walls 34 and 35 adapted to cooperate with the surfaces 31 and 32 respectively. Substantially the same amount of clearance is provided between the surfaces 31 and 32 and the walls 34 and 35 as is provided between the inclined surfaces of the block and the inclined walls of the opening 21. The arrangement is preferably such, however, that the surface 31, for example, will engage the wall 34 slightly in advance of the engagement of the inclined surface 25 with the wall 22. It will be apparent that the vertically disposed surfaces and walls, when brought into engagement on one side or the other of the block, will prevent any undesirable tipping. The extension 30 projects some distance below the arcuate surface 27, thereby providing a shoulder 36 which may directly engage the journal. This serves to assist in maintaining the proper alinement between the parts.

As the oil ring is rotated in a clockwise direction, for example, (Fig. 3) oil which is picked up by the ring in its rotation through the bath of oil in the reservoir 16 will be carried toward the top of the journal, and as it passes under the edge 29 of the scraper block, it will be removed from the outer surface of the ring and forced through the channel formed between the wall 22 and surface 25.

Due to the relatively rapid rotation of the ring this oil will be carried up in relatively large quantities and will be forced under considerable pressure through this passage into reservoir 37 at the top of the brass. This reservoir may in part be formed by the upper surface 38 of the block, if desired. Oil which thus accumulates in the reservoir is delivered by feed lines 39 and 40 formed in the top of the brass to passages 41 which convey the oil to recesses 42 in the under surface of the brass. These recesses in turn communicate with longitudinally extending grooves 43 which open outwardly toward the journal. The lubricant is thus presented to the journal throughout the length of the grooves 43. If the movement of the ring is sufficiently rapid to produce circulation of a large volume of oil it will be forced in a steady stream through the channels mentioned. If, on the other hand, the movement is less rapid the oil will merely flow along the upper walls of the grooves 43 and will drop from the upper edges onto the journal. Should it be found desirable to deflect the lubricant toward the side of the brass corresponding to the side on which the ring is lifting the oil and from which the oil is being scraped, the top of the block 24 may, for this purpose, be extended a slight distance above the base of the reservoir 37 or the top of the block may be provided with a baffle wall (indicated in dotted lines, in Fig. 3), extending longitudinally of the journal and serving to partially or completely divide the reservoirs into two parts. In this way the portion of the journal which is being carried upwardly into the bearing zone will be most effectively lubricated.

Any suitable form of closure may be provided for the forward end of the journal box. This may include a lid 45, a clamp 46, and a bolt 47 as illustrated in Figs. 1 and 2. The rear end of the box may be provided with an oil retaining felt 48 and to assist in the retention of the oil within the box the journal may be provided with an oil retaining ring 49.

The construction just described serves to very effectively lubricate the bearing surfaces of a plain bearing journal box. It will be apparent that due to the symmetry or duplication of the parts on the two sides of the journal axis proper lubrication will be provided for either direction of rotation of the journal.

The box described, having the reservoir 16 only at the forward end, is particularly adapted for insertion in the ordinary arch bar type of frame.

In order that the brass may be continued in use until it has received the usual amount of wear on the Babbitt metal lining, the walls 19 and 20 of the groove which receives the oil ring should be parallel and permit the brass to gradually settle down upon the ring without interference. Furthermore, the depth of the groove in the brass is preferably substantially greater than the thickness of the ring so that wear of the babbitt may occur without danger of pinching the ring.

Referring now to Figs. 8, 9 and 10 a slightly modified form of construction is illustrated. The oil ring 50 is fitted within a groove 51 adjacent the forward end of the brass and cooperates with a scraper block 52 carried by an opening 53 extending from the groove 51 to the top of the brass. This opening is of slightly greater dimension in a direction longitudinally of the box than the opening 21 of the first form of the invention disclosed. This is to permit the provision of a downwardly extending flange 54 in front of the oil ring, as well as a projection 55 corresponding to the projection of the extension 30 of the block shown in Fig. 7. In this way the oil ring is confined both on its front and rear sides between projections formed on the scraper block. The oil which is carried up by the ring is removed from its upper surface in the same manner as already explained, and is forced into a reservoir 530 formed at the top of the opening 53. From this reservoir the oil may be led directly through substantially vertical ducts 56 into longitudinally extending grooves 57 which are formed on the inner surface of the brass and extend substantially the entire length of the same. The block 52 will be shifted to one side or the other just as in the case of the block 24 and the oil will be forcibly distributed from the reservoir at the bottom of the journal box to the bearing surfaces regardless of the direction of rotation of the journal.

Referring now to Figs. 11-15, inclusive, there is here illustrated an adaption of the features of the present invention to another form of a journal box which is here shown as integral with the side frame. Thus the box 58 may be connected by integral extensions 59 directly with the side frame of any suitable construction. At the bottom of the box the reservoir 60 may, in this case, extend substantially throughout the length of the box. This will permit mounting of the oil ring 61 at substantially a mid point rather than adjacent the front end of the box. The brass will, in this instance, be provided with a groove 62 adjacent its center adapted to receive and guide the oil ring at the upper end of its travel. Within an opening 63 extending from the groove 62 to the top of the brass there is adapted to be mounted a block 64 having the same function as the block 24 previously described.

In order to avoid any possible danger of twisting of the block within the opening as it is slid from one side to the other, it may be provided with extensions 65, having vertically disposed surfaces 66, at each side of the portion of the block which cooperates with the upper surface of the oil ring. These extensions 65 may each be provided with projections 67 so that the ring is confined by the block on both the front and rear sides. These projections 67 may be of such length as to contact with the journal and thus maintain a clearance between the ring and the cooperating face of the block. In operation the ring and block 64 will function in the same manner as the ring 18 and block 24 of the first form of the invention. Oil which is carried upwardly by the ring 61 and removed from its upper surface by one of the edges of the block will be carried into the reservoir 68 which extends across the top of the block. This reservoir is provided with distributing branches 69 adapted to convey the oil ducts 70 which deliver the oil to recesses 71 in the under surface of the brass from which it is distributed through the longitudinally extending grooves 72 to the bearing surface of the journal.

In Figure 11 there is indicated the oil level within the journal box as the car on which it is mounted is standing on a level track or on a 14% bank which is the maximum normally encountered. In each instance as indicated by the notations, the level of the oil with the car in motion as well as when standing still is shown. When the car is moving it will be understood that the level drops somewhat due to the circulation of a portion of the oil. In any case it will be apparent that there is no danger of losing oil through the opening at the rear of the box.

While the blocks 24, 52 and 64 have been shown as formed of solid metal, it will be apparent that they might instead be formed of sheet metal bent into the desired shape. A block 73 of this character adapted to be substituted for the block 24 of the first embodiment of the invention is illustrated in Fig. 16.

While several illustrative forms of the invention have been disclosed in considerable detail, it will be understood that various modifications may be made in the construction and arrangement of the several parts without departing from the general spirit and scope of the invention as defined by the claims.

What we claim is:

1. In a plain bearing journal box having a brass between the journal and the top of the box, an oil reservoir at the bottom of said box, an oil conveying member carried by said journal beneath the brass and depending into said reservoir, an opening through said brass above said member, a block within said opening cooperating with said member to remove oil therefrom, and means for distributing said oil to the bearing surfaces, said block having a smaller transverse dimension than said opening and being shiftable within said opening in the direction of movement of the adjacent portion of the member to provide a passage for the oil on either side of the block depending upon the direction of rotation of the journal.

2. In a plain bearing journal box having a brass between the journal and the top of the box, an oil reservoir at the bottom of said box, an oil conveying member carried by said journal beneath the brass and depending into said reservoir, an opening through said brass above said member, a block within said opening cooperating with said member to remove oil therefrom, and means for distributing said oil to the bearing surfaces, said block having a smaller transverse dimension than said opening and being shiftable within said opening in the direction of movement of the adjacent portion of the member to provide a passage for the oil on either side of the block depending upon the direction of rotation of the journal, and said block and opening having vertically disposed cooperating surfaces for limiting the movement of the block within the opening.

3. In a journal box adapted to surround a journal, a bearing member between the top of the box and the journal, an oil reservoir at the bottom of the box, an oil conveying member carried by said journal and depending into said reservoir, an opening through said bearing member above said conveying member, a block within said opening and adapted to remove oil from the surface of said conveying member, said block being shiftable transversely within said opening to provide a passage on either side of said block depending upon the direction of rotation of the journal, and means for distributing the oil from said passage to the bearing surfaces.

4. In a journal box adapted to surround a journal, a bearing member between the top of the box and the journal, an oil reservoir at the bottom of the box, an oil conveying member carried by said journal and depending into said reservoir, an opening through said bearing member above said conveying member, a block within said opening and adapted to remove oil from the surface of said conveying member, said block being shiftable transversely within said opening to provide a passage on either side of said block depending upon the direction of rotation of the journal, and means for distributing the oil from said passage to the bearing surfaces, said block and opening having cooperating, vertically disposed surfaces for limiting the shifting of said block.

5. In a journal box adapted to surround a journal, a bearing member between the box and journal, said member having a recess adjacent its top, said recess having end walls inclined to the vertical, an oil conveying member carried by the journal beneath said recess, and a shiftable block within said recess having end surfaces parallel with said end walls, said block having one or the other of its end surfaces spaced from the corresponding wall to provide a passage for oil removed by said block from said conveying member.

6. In a journal box adapted to surround a journal, a bearing member between the box and journal, said member having a recess adjacent its top, said recess having end walls inclined to the vertical, an oil conveying member carried by the journal beneath said recess, and a shiftable block within said recess having end surfaces parallel with said end walls, said block having one or the other of its end surfaces spaced from the corresponding wall to provide a passage for oil removed by said block from said conveying member, said recess and block having cooperating surfaces adapted to prevent tipping of the block within the recess.

7. Oil distributing devices comprising a bearing member having a groove in its under surface, an oil conveying member beneath said bearing member adapted to fit in said groove, said bearing member having a recess at the top of said groove, a block slidably mounted within said recess and cooperating with said conveying member to remove oil therefrom, said block being shiftable to provide a passage for said oil on either side of the block depending upon the direction of rotation of said conveying member, and means for distributing the oil removed from said conveying member.

8. Oil distributing devices comprising a bearing member having a groove in its under surface, an oil conveying member beneath said bearing member adapted to fit in said groove, said bearing member having a recess at the top of said groove, a block slidably mounted within said recess and cooperating with said conveying member to remove oil therefrom, a projection on said block cooperating with the edge of said conveying member to maintain alinement thereof, said block being shiftable to provide a passage for oil on either side of the block depending upon the direction of rotation of said conveying member, and means for distributing the oil removed from said conveying member.

9. Oil distributing devices comprising a bearing member having a groove in its under surface, an oil conveying member beneath said bearing member adapted to fit in said groove, said bearing member having a recess at the top of said groove, a block mounted within said recess and cooperating with said conveying member to remove oil therefrom, the cooperating faces of said conveying member and block being curved over arcs of different radii and means for distributing the oil removed from said conveying member.

10. Oil distributing devices comprising a bearing member having a groove in its under surface, an oil conveying member beneath said bearing member adapted to fit in said groove, said bearing member having a recess at the top of said groove, a block slidably mounted within said recess and cooperating with said conveying member to remove oil therefrom, said block having only line contact with said conveying member and providing a passage for said oil on either side of the block depending upon the direction of rotation of said conveying member, and means for distributing the oil removed from said conveying member.

11. In a plain bearing journal box having a brass between the journal and the top of the box, an oil reservoir at the bottom of said box, an oil conveying member loosely carried by the journal and depending into said reservoir, a second oil reservoir above said member, said brass being provided with a groove to snugly receive a portion of said member, and means associated with said brass movable laterally and radially of the journal for directing oil from said member to said second reservoir, and means for distributing oil from said second reservoir to the journal.

12. In a plain bearing journal box having a brass between the journal and the top of the box, an oil reservoir at the bottom of said box, an oil conveying member carried by said journal beneath the brass and depending into said reservoir, an opening through said brass directly above said member, a freely movable block within said opening cooperating with and shiftable laterally of the journal by said oil conveying member for removing oil therefrom upon rotation of said journal in either direction, and means for distributing said oil to the bearing surfaces.

13. Oil distributing devices comprising a bearing member having a groove in its under surface, an oil conveying member having a smooth outer surface beneath said bearing member adapted to fit in said groove, said conveying member being shiftable in either direction, said bearing member having a recess at the top of said groove, means engaging said oil conveying member and shiftable thereby within said recess in either direction of movement of the adjacent portion of said member for removing oil from said oil conveying member, and means for distributing said oil along the under surface of said bearing member.

14. In a plain bearing journal box having a brass between the journal and the top of the box, an oil reservoir at the bottom of said box, an oil conveying member having a smooth outer surface freely supported on said journal and adapted to receive oil from said reservoir, a chamber in the top of said brass above said conveying member, said brass having associated therewith a passage leading from said conveying member to said chamber, movable means supported on said member adapted to transfer oil therefrom through said passage to said chamber in the brass, and channels in said brass for distributing said oil from said chamber to the bearing surfaces.

15. In a journal box adapted to surround a journal, a bearing member between the top of the box and the journal, an oil reservoir at the bottom of the box, an oil conveying member having a smooth outer surface freely supported by said journal and depending into said reservoir, said bearing member having a groove in its under surface arranged to receive said oil conveying member and forming a pocket therewith, means mounted in said bearing member and supported on the outer surface of said conveying member for removing oil therefrom, and passages in said bearing member communicating with said pocket for delivering the oil removed therefrom by said means to the bearing surfaces.

WILLIAM BLACKMORE.
ALBERT O. BUCKIUS.